United States Patent [19]
Pines

[11] Patent Number: 5,075,549
[45] Date of Patent: Dec. 24, 1991

[54] PYROELECTRIC DETECTOR USING ELECTRONIC CHOPPING

[75] Inventor: Michael Y. Pines, Los Angeles, Calif.

[73] Assignee: Hughes Aircraft Company, Los Angeles, Calif.

[21] Appl. No.: 626,135

[22] Filed: Dec. 11, 1990

[51] Int. Cl.$^5$ .......................................... H01L 27/146
[52] U.S. Cl. .................. 250/332; 250/338.1; 250/338.2; 250/338.3
[58] Field of Search .................. 250/332, 338.3, 338.2, 250/338.1

[56] References Cited

U.S. PATENT DOCUMENTS

| | | | |
|---|---|---|---|
| 3,794,986 | 2/1974 | Murayama | 307/400 |
| 4,663,529 | 5/1987 | Jenner et al. | 250/338.2 |
| 4,780,612 | 10/1988 | Klatt | 250/336.1 |
| 4,831,257 | 5/1989 | McClelland et al. | 250/338.1 |
| 4,897,547 | 1/1990 | Iwasa et al. | 250/338.1 |
| 4,902,894 | 2/1990 | Butler et al. | 250/338.1 |
| 4,926,051 | 5/1990 | Turnbull | 250/332 |

Primary Examiner—Constantine Hannaher
Attorney, Agent, or Firm—William J. Streeter; Wanda K. Denson-Low

[57] ABSTRACT

A pyroelectric detector using electronic chopping of the detector bias signal to reset the detector. The detector is preferably operated slightly above or below its Curie temperature. Multiplexing of a plurality of electronically-reset detectors is also disclosed.

17 Claims, 2 Drawing Sheets

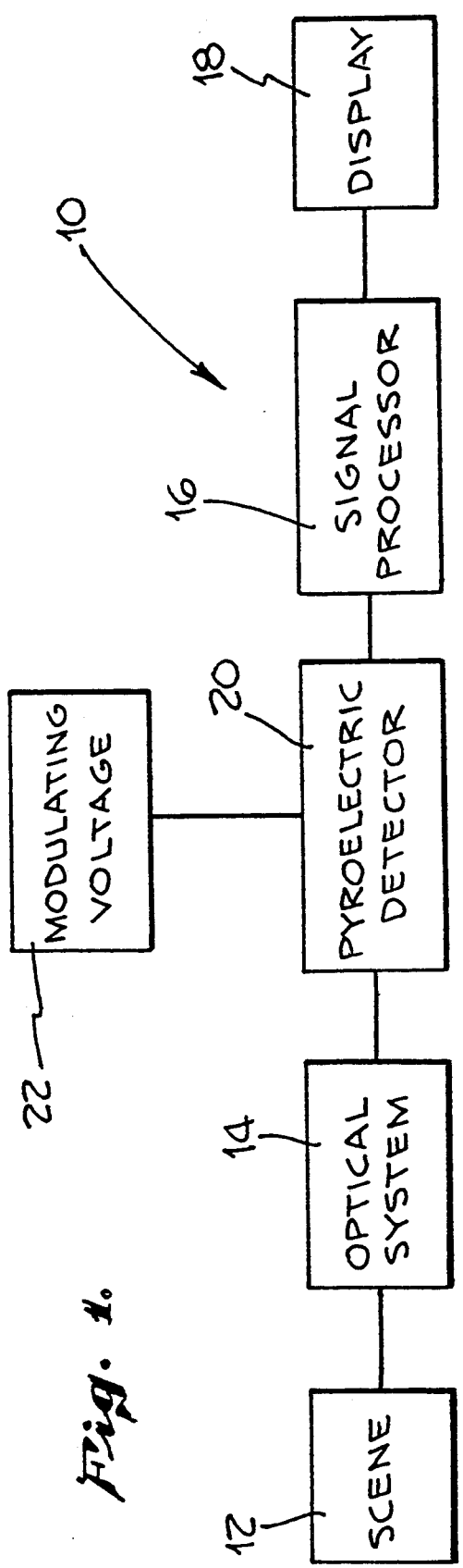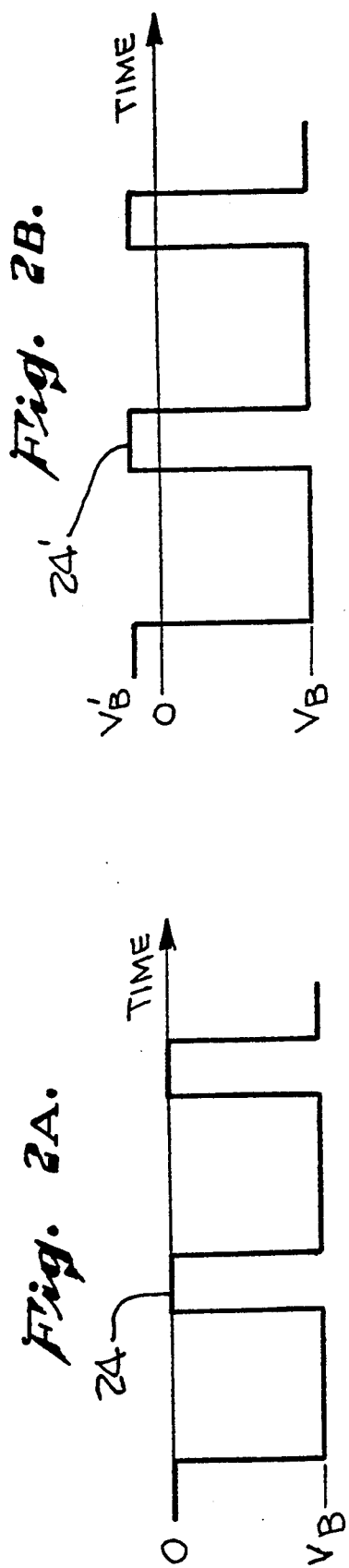

PYROELECTRIC DETECTOR USING ELECTRONIC CHOPPING

BACKGROUND OF THE INVENTION

1. Field of the Invention

The present invention generally relates to thermal imaging systems (sometimes also referred to as FLIRs) for detecting scene information and displaying an image of that information. More specifically, it relates to such systems which utilize a pyroelectric detector that is periodically reset.

2. Description of Related Art

It is known in the field of thermal imaging systems to display an image of a scene by receiving scene information through an optical system that focuses the scene information on a detector. In response to the scene information, the detector generates electrical signals representative of the scene. These are processed and used to create an image on a display device.

A pyroelectric uncooled focal plane array detector used in this type of system is shown in Shaham, U.S. Pat. No. 4,740,700. The uncooled pyroelectric detector elements in this system are AC coupled. The focal plane array must therefore be periodically reset or normalized. Otherwise, the scene information must change during operation.

To image a static or non-changing scene, the signals produced by the scene information usually must be stored and subtracted from the signals produced while the scene information is blocked from the detector. This is usually accomplished by a mechanical chopper positioned between the optical system and the detector in the system. The mechanical chopper alternately passes and blocks the scene information, thereby effectively resetting the detector elements of the focal plane array. The normal scene signal is then electronically subtracted from the blocked scene signal.

The use of a mechanical chopper complicates the system. It must be introduced in the optical path. This requires a moving mechanical part which reduces reliability and increases cost. A need therefore exists for a workable thermal imaging system which does not need a mechanical chopper.

SUMMARY OF THE INVENTION

It is an object of the present invention to obviate these and other problems with the prior art.

It is a further object of the present invention to provide a pyroelectric detector which requires no moving parts.

It is a further object of the present invention to provide a pyroelectric detector which resets electronically.

These as well as other objects and features of the present invention are achieved by replacing the mechanical chopper used in the prior art with a modulating voltage. The modulating voltage is applied as a bias to the detector elements.

In one preferred embodiment, the modulation is substantially in the form of a square wave which drops to substantially zero voltage during a portion of its cycle. During the substantially zero voltage portion of the cycle, the detector is reset. In this mode, the detector is operated slightly above its Curie temperature. Multiplexing the outputs of a plurality of detector elements is also contemplated using a single modulating voltage source to reset the same.

Another preferred embodiment is biasing the detector to an opposite polarity during the reset period. In this mode, operation occurs slightly below the Curie temperature.

Other features and advantages of the present invention will become apparent by reference to the following detailed description when considered in conjunction with the accompanying drawings.

BRIEF DESCRIPTION OF THE DRAWINGS

FIG. 1 is a block diagram of a pyroelectric detection system using an electronic chopper made in accordance with the present invention.

FIGS. 2A and 2B are graphs of preferred forms for the modulating voltage used in the present invention.

DESCRIPTION OF THE PREFERRED EMBODIMENTS

Figure 3:
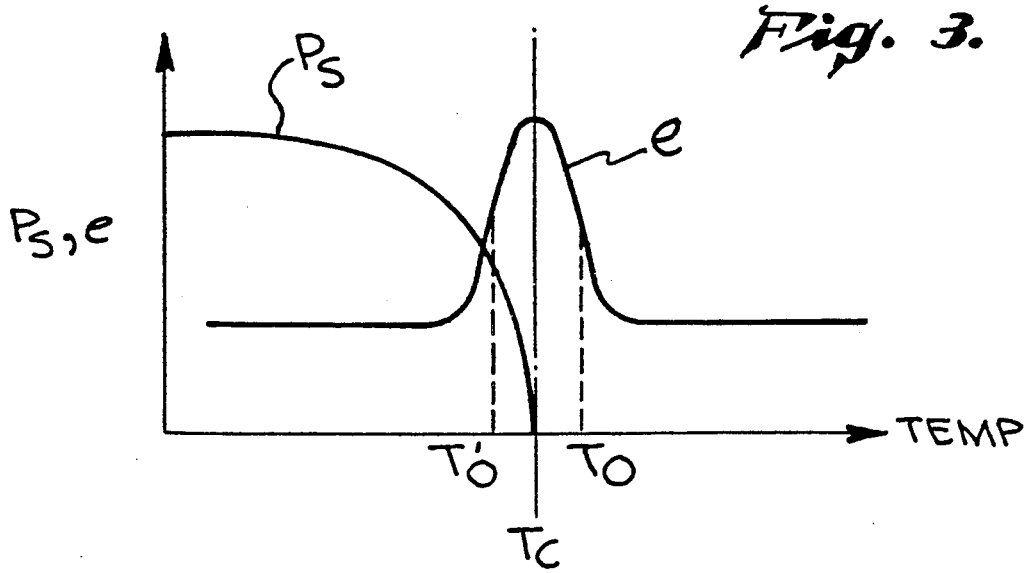
FIG. 3 illustrates the spontaneous polarization ($P_s$) and the dielectric constant (e) of a pyroelectric detector, both as a function of operating temperature.

FIG. 1 is a block diagram of a pyroelectric detection system made in accordance with the present invention.

As shown in FIG. 1, a pyroelectric detection system 10 typically includes scene information 12 focused by an optical system 14 on at least one pyroelectric detector 20. The output of the detector 20 is then processed by a signal processor 16, the output of which is displayed on a display 18.

In the prior art, a mechanical blocking device known as a "chopper" was typically inserted between the optical system 14 and the pyroelectric detector 20. This mechanical device physically blocked the passage of scene information from the optical system 14 to the pyroelectric detector 20 on a periodic basis. The effect was to reset the pyroelectric detector 20 on a periodic basis, thereby preventing the image on the display 18 from fading.

The present invention does not need a mechanical chopper. Instead, the pyroelectric detector 20 is biased by a modulating voltage 22.

One preferred waveform of the modulating voltage 22 is shown in FIG. 2A. As shown in FIG. 2A, the waveform consists substantially of a square wave signal 24 which switches between a voltage $V_B$ and substantially zero throughout its cycle for the case of working about a temperature $T_o$ above the Curie temperature $T_c$. Another preferred waveform of the modulating voltage 22 is also shown in FIG. 2B as 24' for the case of operating about a temperature $T_c'$ below the Curie temperature, $T_c$.

As noted above, the temperature at which the pyroelectric detector 20 is operated may be slightly above or slightly below the Curie temperature of the pyroelectric detector 20. The reason for this temperature selection is best understood by reference to FIG. 3 and the following explanation.

There is a mathematical relationship between the pyroelectric coefficient p of the pyroelectric detector 20, its spontaneous polarization $P_s$, the electrical field across it E, its dielectric constant e, and the operating temperature T. That relationship may be stated as follows:

$$p = \delta P_s / \delta T + E \times \delta e / \delta T$$

FIG. 3 is a graphic illustration of the spontaneous polarization $P_s$ of a typical pyroelectric detector 20 and its dielectric constant e, both as a function of temperature. The X axis represents temperature. The Y axis represents values of the spontaneous polarization $P_s$ and the dielectric constant e. The notation on the X axis $T_c$ represents the Curie temperature of the pyroelectric detector 20.

As can be seen from FIG. 3, the spontaneous polarization $P_s$ of a typical pyroelectric detector 20 falls to zero at the Curie temperature and remains zero at temperatures above the Curie temperature. For temperatures above the Curie temperature, therefore, the first term in the equation above, $$\delta P_s/\delta T,$$

is zero.

When operating above its Curie temperature, therefore, the pyroelectric detector 20 typically has a pyroelectric coefficient p which is directly proportional to the electric field E which is across it. As a consequence, the pyroelectric coefficient p of the photoelectric detector 20 will directly track the electric field E across it when it is above its Curie temperature. By dropping the electric field E to zero through application of the modulating voltage 22 on a periodic basis, the pyroelectric detector 20 is effectively reset, just as it would have been had a mechanical chopper been used instead.

In one preferred embodiment, the operating temperature of the pyroelectric detector 20 should be just slightly above its Curie temperature. This results in maximum sensitivity because the $$\delta e/\delta T$$

is greatest (i.e., has the greatest slope) at this point. This temperature is graphically illustrated in FIG. 3 on the X axis as $T_o$.

It is also possible to operate the pyroelectric detector 20 at temperatures below its Curie temperature in accordance with the present invention, for example at a temperature $T_o'$. In this mode, however, a slightly positive voltage for the lower level of the modulating voltage 22 would typically be necessary. This is because the first term in the equation noted above will have a negative value at temperatures below the Curie temperature, requiring a corresponding positive value for the electric field E during the reset times in order to effectuate a satisfactory (net zero) reset.

In the preferred embodiment, materials such as KTN, BST, PLZT, and PST are used as these have Curie temperatures which are near room temperature.

Although having been thus far discussed in reference to a single pyroelectric detector, it is to be understood that the present invention is equally applicable to an array of pyroelectric detectors, such as are commonly used in the art. In this instance, the modulating voltage would simply be applied to all of the pyroelectric elements in the array.

Figure 4:
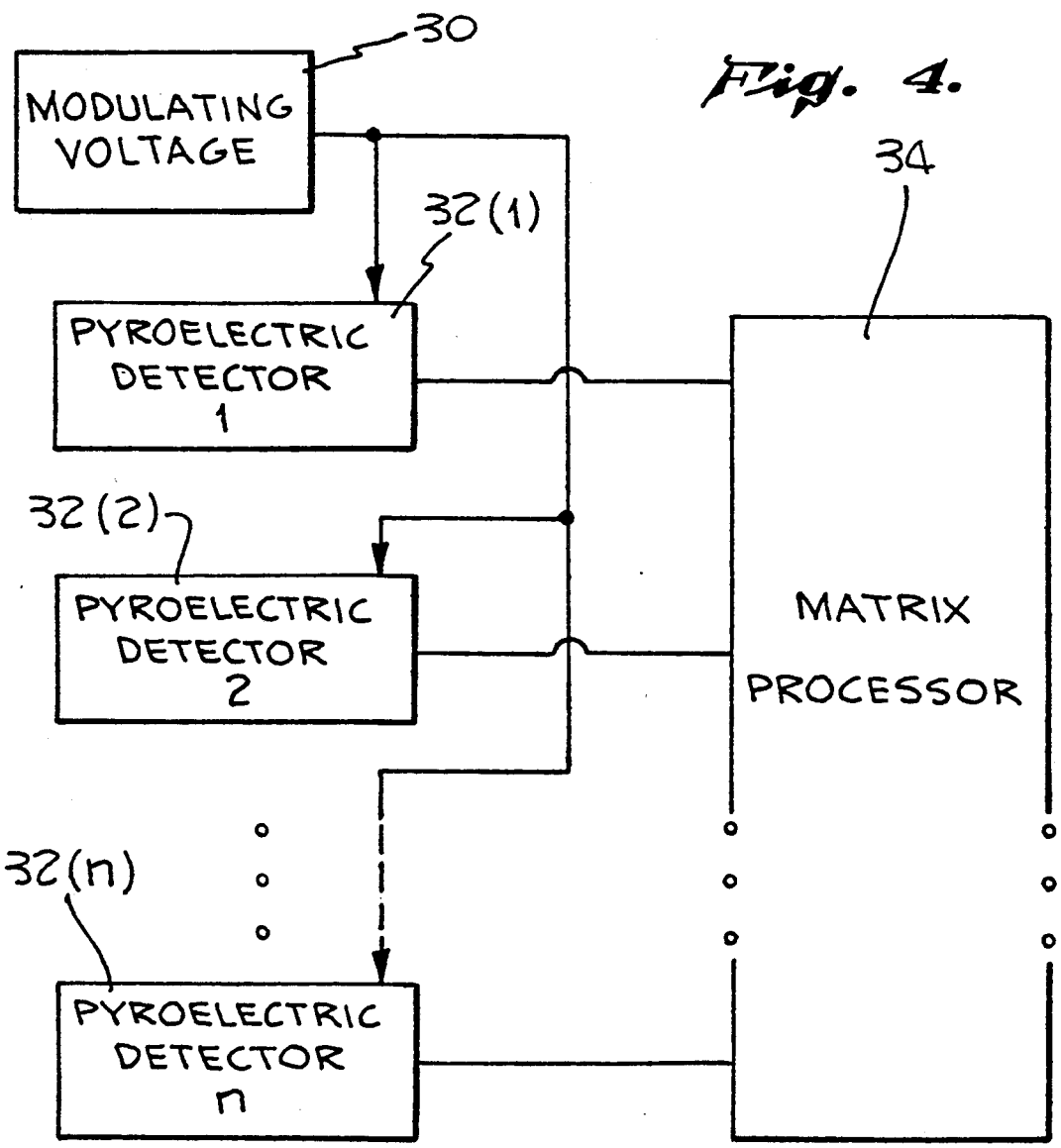
FIG. 4 is a functional block diagram showing the present invention applied to a plurality of pyroelectric detectors connected in a matrix configuration.

A typical configuration for such an array of pyroelectric detectors is shown in FIG. 4. It would typically include a modulating voltage source 30 (which would be governed by the same considerations as discussed above with reference to the modulating voltage source 22), a plurality of pyroelectric detectors 32(l)-32(n), and a matrix processor 34. More details concerning the construction of such an array of detectors, including their associated processor, is described in U.S. Pat. No. 4,740,700. The principal difference with the subject invention would be the addition of the modulating voltage 30.

Having thus described exemplary embodiments of the present invention, it should be noted by those skilled in the art that the within disclosures are exemplary only and that various other alternatives, adaptation, and modifications may be made within the scope of the present invention. Accordingly, the present invention is not limited to the specific embodiments as illustrated herein, but is only limited by the following claims.

What is claimed is:

1. A pyroelectric detection system comprising:
   a. a pyroelectric detector arranged to constantly receive scene information without periodic interruption by a mechanical chopper; and
   b. modulation means connected to said pyroelectric detector for imposing on said pyroelectric detector a varying electrical signal which substantially and repeatedly resets said pyroelectric detector.

2. The system of claim 1 wherein said pyroelectric detector is operated below or above its Curie temperature.

3. The system of claim 2 wherein said pyroelectric detector is operated at substantially the temperature at which the rate of change of its dielectric constant with respect to temperature is greatest at a temperature above the Curie temperature.

4. The system of claim 2 wherein said pyroelectric detector is operated at substantially the temperature at which the sum of the rate of change of spontaneous polarization with respect to temperature and the rate of change of the dielectric constant with respect to temperature times the electric field is greatest at a temperature below the Curie temperature.

5. The system of claim 1 wherein the pyroelectric detector includes a material whose Curie temperature is substantially equal to room temperature.

6. The system of claim 5 wherein said pyroelectric detector includes KTN, BST, PLZT, or PST.

7. The system of claim 1 whether said varying electrical signal is substantially a square wave.

8. The system claim 7 wherein said square wave is periodically at substantially zero volts during reset for operation above the Curie temperature.

9. The system of claim 7 wherein said square wave is periodically a positive voltage during reset for operation below the Curie temperature.

10. The system of claim 1 further including:
    a. an optical system for directing the scene information on said pyroelectric detector;
    b. a signal processor connected to said pyroelectric detector for processing the signal developed by said pyroelectric detector; and
    c. a display connected to said signal processor for displaying the scene information received by said pyroelectric detector.

11. A thermal imaging system comprising:
    a. a plurality of pyroelectric detectors arranged in an array to constantly receive scene information without periodic interruption by a mechanical chopper;
    b. modulation means connected to said pyroelectric detectors for imposing on said pyroelectric detectors a varying electrical signal which substantially and repeatedly resets said pyroelectric detectors; and c. processing means connected to said pyroelectric detectors for processing the signals generated by said pyroelectric detectors.

12. The system of claim 11 wherein said pyroelectric detectors have Curie temperatures which are substantially room temperature and wherein said pyroelectric detectors are operated at a temperature slightly below or above their Curie temperature.

13. The system of claim 11 further including:
a. an optical system for directing the scene information on said pyroelectric detectors; and
b. a display connected to said processing means for displaying the scene information received by said pyroelectric detectors.

14. A process for displaying a thermal image of scene information comprising the steps of:

a. constantly directing the scene information without periodic interruption by a mechanical chopper onto an array of pyroelectric detectors;
b. processing the signals developed by said pyroelectric detectors;
c. displaying the process signal; and
d. modulating the pyroelectric detectors with a varying electrical signal which substantially and repeatedly resets said pyroelectric detectors.

15. The process of claim 14 wherein substantially a square wave is used in said modulation step.

16. The process of claim 15 wherein said square wave periodically drops to substantially zero volts above the Curie temperature or to a positive voltage below the Curie temperature for resetting.

17. The process of claim 14 wherein said pyroelectric detectors are operated below or above their Curie temperature.

* * * * *